United States Patent
Watanabe et al.

(10) Patent No.: US 6,286,136 B1
(45) Date of Patent: Sep. 4, 2001

(54) COMPILE PROCESSING APPARATUS AND METHOD AND PROGRAM EXECUTING APPARATUS AND METHOD

(75) Inventors: Yuji Watanabe, Kawasaki; Yukihiro Kimura; Kaname Mita, both of Shizuoka; Masakazu Hayashi, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/181,927

(22) Filed: Oct. 29, 1998

(30) Foreign Application Priority Data

Oct. 30, 1997 (JP) .................................................. 9-298105

(51) Int. Cl.[7] ....................................................... G06F 9/45
(52) U.S. Cl. ................................................................. 717/9
(58) Field of Search ...................................................... 717/9

(56) References Cited

U.S. PATENT DOCUMENTS 5,555,411 * 9/1996 England et al. ........................... 717/5
5,832,275 * 11/1998 Olds .......................................... 717/11
6,085,034 * 7/2000 Danforth ................................... 717/3

OTHER PUBLICATIONS

Shim et al., A Real–Time Reconfigurable Entrance Control System, May 1996, IEEE, pp. 244–251.*
Sunaga et al., Applicability of "Plug–in" Online File Modifications . . . , Sep. 1998, IEEE, pp. 314–318.*

* cited by examiner

Primary Examiner—Mark R. Powell
Assistant Examiner—John Q. Chavis
(74) Attorney, Agent, or Firm—Staas & Halsey LLP

(57) ABSTRACT

A compile processing apparatus compiles a program formed of a plurality of classes having initializing procedures. The compile processing apparatus includes a specifying unit for specifying an initializing procedure when a statement to be compiled requires the initializing procedure, a determination unit for executing a determination process for determining whether the initializing procedure specified by the specifying unit can be considered to not affect other classes, and a changing unit for changing the statement so that the statement does not access the initializing procedure when the determination unit determines that the initializing procedure can be considered to not affect the other classes.

18 Claims, 15 Drawing Sheets

FIG.5

| ID | ATTRIBUTE INFORMATION |
|---|---|
| 1 | DATA OF ANOTHER CLASS IS ACCESSED |
| 2 | PROCEDURE OF ANOTHER CLASS IS ACCESSED |
| ⋮ | ⋮ |

FIG.6

| ID | LEVEL | ATTRIBUTE INFORMATION |
|---|---|---|
| 1 | 1 | a a a a a a a a a a a a a |
| 2 | 1 | b b b b b b b b b b b b b |
| 3 | 3 | c c c c c c c c c c c c c |
| 4 | 2 | d d d d d d d d d d d d d |
| ⋮ | ⋮ | ⋮ |

FIG. 11 a. class

```
class a {
    void main () {
        b.i = b.i + 1;
        b.print_b ();
    }
    CI [ static {
          System.out.println ("START");
        }
    }
}
``` b. class

```
class b {
    public int i;
    void print_b ()
        System.out.println (i);
    }
    CI [ static {
            i = 0;
        }
    }
}
```

FIG. 12

```
Method void main ()
 0 getstatic  #8  <Field int i>
 3 iconst_1
 4 iadd
 5 putstatic  #8  <Field int i>
 8 invokestatic #10 <Method void print_()>
11 return Method static {}
 0 getstatic  #9  <Field java.io.printstream out>
 3 ldc #1 <String "START">
 5 invokevirtual #11 <Method void println(java.lang.String)>
 8 return
```

FIG. 13

```
Method void print__()
0 getstatic #7 <Field java.io.PrintStream out >
3 getstatic #6 <Field int i>
6 invokevirtual #8 <Method void println(int) >
9 return
Method static
0 iconst_0
1 put static #6 <Field int i>
4 return
```

FIG. 14

```
Method void main()
 0 getstatic_quick #8 <Field int i>
 3 iconst_1
 4 iadd
 5 putstatic_quick #8 <Field int i>
 8 invokestatic #10 <Method void print__()>
11 return Method static {}
 0 getstatic #9 <Field java.io.printStream out>
 3 ldc #1 <String "START">
 5 invokevirtual #11 <Method void println(java.lang.String)>
 8 return
```

FIG. 15

```
        ┌─ void start ( ) {
        │    if (a. init_flg = ON ) a. clinit ( );
      α │    if (b. init_flg = ON ) b. clinit ( );
        │  }
        └
a. obj
```

```
a. init_flg = OFF ;

void a. main ( ) {
  b. i = b. i + 1 ;
  b. print_b ( );
}
void a. clinit ( ) {
  System. out. println ("START");
}
``` b. obj

```
b. init_flg = ON ;

int i ;
void b. print_b ( ) {
  System. out. println (i);
}
void b. clinit ( ) {
  i = 0 ;
}
```

FIG. 16 a.obj

```
void a.main () {
  if (b.initflg==OFF) b.clinit();
  b.i = b.i + 1;
  b.print_b();
}
void a.clinit () {
  System.out.println ("START" ;
}
``` b.obj

```
b.initflg = OFF;
int i;
void b.print_b () {
  System.out.println (i);
}
void b.clinit () {
  i = 0;
  b.initflg = ON;
}
```

COMPILE PROCESSING APPARATUS AND METHOD AND PROGRAM EXECUTING APPARATUS AND METHOD

BACKGROUND OF THE INVENTION

1. Field of the Invention

The present invention relates to a compile processing apparatus and method compiling a program formed of a plurality of classes each of which is provided with an initializing step. The present invention also relates to a storage medium storing a program causing a computer to execute a process in the above compile processing apparatus. Further, the present invention relates to a program executing apparatus and method executing a program formed of a plurality of classes each of which is provided with an initializing step and to a storage medium storing a program causing a computer to execute a process in the above program executing apparatus.

2. Description of the Related Art

In the resent years, programming for a computer system has been complex. The number of programs in which the initialization must be provided as the language specification is increased. Due to such programs, even if a programmer is not conscious to the initialization, the initialization process can be executed. As a result, the number of mistakes in a program can be decreased.

The initialization process may be executed once in the beginning. To ensure this condition, an execution speed of a program is lowered. Thus, it is necessary to improve the execution speed of such a type of program.

A program, such as an object oriented program, is formed of a plurality of classes in each of which data and procedure are encapsulated.

Such a class is used to execute data processing based on message communication. In the message communication, reference of data and access of procedure can be performed.

Further, the class has an initializing step which is named as a class-initializer. The class-initializer executes an initializing process once before the data is accessed in the beginning or before the procedure is accessed in the beginning.

To ensure activating the class-initializer only once, a conventional compiler inserts an IF-sentence for checking whether the class-initializer has been activated when a statement requiring the class-initializer is compiled. As a result, when it is determined, by the IF-sentence, that the class-initializer has been activated, a process is carried out so that the call-initializer is not accessed. On the other hand, when it is determined that the class-initializer has not yet been activated, the class-initializer is accessed and a flag indicating the activation of the class-initializer is activated in the class provided with the class-initializer.

In addition, there is another programming technology in which the format of the program is changed to that having no class-initializer while the program is being executed. Due to such a programming technology, activating the class-initializer only once is ensured.

However, according to the former technology in which activating the class-initializer only once is ensured by insertion of the IF-sentence, if the class-initializer is accessed a large number of times, the execution speed of the program is lowered since the IF-sentence is checked every time the class-initializer is accessed.

The latter technology in which the format of the program is changed to that having no class-initializer while the program is being executed to ensure activating the class-initializer only once is useful for a case, such as a case of an interpreter, where an interpreting process and a process are simultaneously executed. However, in a case where the interpreting process and a process are separately executed, a system for changing the format of the program is needed to provided in the program and the execution speed of the program is lowered by the execution of the system.

SUMMARY OF THE INVENTION

Accordingly, a general object of the present invention is to provide a novel and useful compile processing apparatus and method in which the disadvantages of the aforementioned prior art are eliminated.

The specific object of the present invention is to provide a compile processing apparatus and method capable of compiling a program formed of a plurality of classes having initializing steps so that the execution speed is improved.

The above objects of the present invention are achieved by a compile processing apparatus compiling a program formed of a plurality of classes having initializing procedures, comprising: specifying means for specifying an initializing procedure when a statement to be compiled requires the initializing procedure; determination means for executing a determination process for determining whether the initializing procedure specified by the specifying means can be considered to not affect other classes; and changing means for changing the statement so that the statement does not access the initializing procedure when the determination means determines that the initializing procedure can be considered to not affect the other classes.

According to the present invention, initializing procedure having no side effect is activated before the program is executed and a program part requiring the initializing procedure having no side effect is changed so that the program part does not access the initializing procedure. Thus, it can be ensured, without using the IF-sentence, that the initializing procedure is activated only once before the program is executed. As a result, the execution speed of the program can be improved.

Another object of the present invention is to provide a program executing apparatus capable of executing the program formed of a plurality of classes having the initializing steps at an improved executing speed.

The above objects of the present invention are achieved by a program executing apparatus executing a program formed of a plurality of classes having initializing procedures, comprising: determination means for determining whether information indicating that an initializing procedure is to be executed is recorded in each of classes when the program is executed; and activation means for activating the initializing procedure included in a class, before the program is executed, when the determination determines that the information is recorded in the class.

BRIEF DESCRIPTION OF THE DRAWINGS

Other objects, features and advantages of the present invention will be apparent from the following description when read in conjunction with the accompanying drawings, in which:

FIG. 5 is a diagram illustrating a side effect determination table;

FIG. 6 is a diagram illustrating a side effect determination table;

FIG. 11 is a diagram illustrating examples of classes provided in a program;

FIG. 12 is a diagram illustrating an example of an intermediate text of a class "a";

FIG. 13 is a diagram illustrating an example of an intermediate text of a class "b";

FIG. 14 is a diagram illustrating a intermediate text to which the intermediate text is changed;

FIG. 15 is a diagram illustrating an example of object codes to which the source program of the class "a" and class "b" shown in FIG. 11 are compiled; and FIG. 16 is a diagram illustrating a conventional case.

DESCRIPTION OF THE PREFERRED EMBODIMENTS

A description will be given, with reference to FIG. 1, of the principle of a compile processing apparatus according to an embodiment of the present invention.

Figure 1:
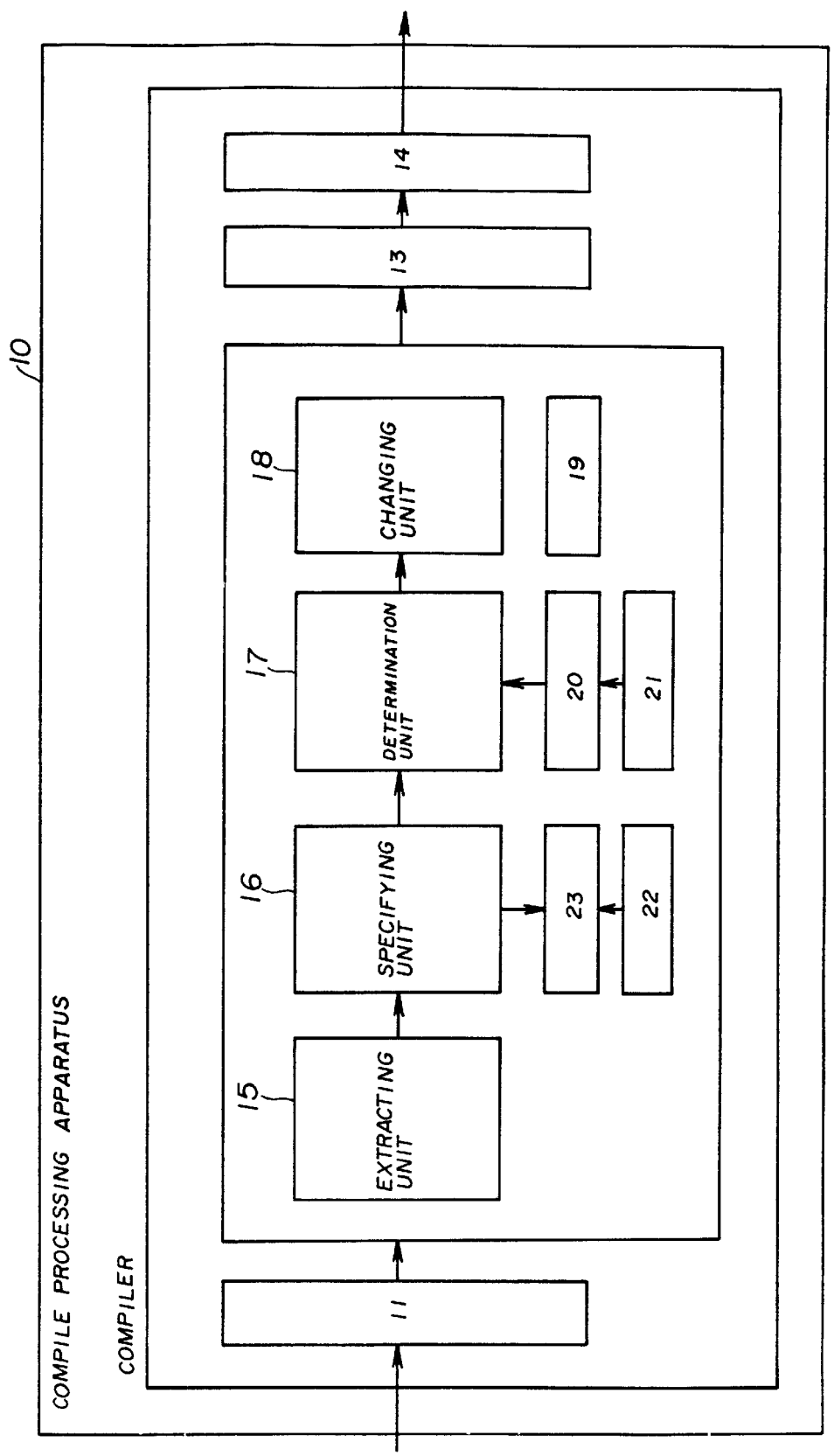
FIG. 1 is a block diagram illustrating a principle of a compile processing apparatus according to an embodiment of the present invention.

Referring to FIG. 1, a compile processing apparatus 10 compiles a program formed of a plurality of classes in each of which an initializing step is provided. The compile processing apparatus 10 has a front end unit 11, an initialization processing unit 12, an optimizing unit 13 and a code generating unit 14. The front end unit 11 converts a source program into an intermediate text. The initialization processing unit 12 arranged after the front end unit 11 executes a changing process for a statement requiring an initializing procedure. The optimizing unit 13 located after the initialization processing unit 12 optimizes the compile processing. The code generating unit 14 located after the optimizing unit 13 generates object codes.

The initialization processing unit 12 has an extracting unit 15, a specifying unit 16, a determination unit 17, a changing unit 18, a recording unit 19, a management unit 20, a registering unit 21, a receiving unit 22 and an excluding unit 23.

The extracting unit 15 extracts statements which are converted into the intermediate texts and should be compiled one by one. The specifying unit 16 specifies an initializing procedure required by a statement extracted by the extracting unit 15. The determination unit 17 determines whether the initializing procedure specified by the specifying unit 16 has a side effect.

When the determination unit 17 determines that the initializing procedure does not have a side effect, the changing unit 18 changes the statement requiring the initializing procedure so that the statement does not access the initializing procedure. Information indicating that the statement is changed as described above is written in a class having the initializing procedure.

The recording unit 19 determines, instead of the changing unit 18, whether each initializing procedure can be considered to not affect other classes. The recording unit 19 then records information indicating this matter in a class having an initializing procedure which may be considered to not affect other classes.

The management unit 20 manages attribute information of an initializing procedure having the side effect. The registering unit 21 registers data in the management unit 20 in accordance with an interactive processing. The receiving unit 22 receives information about a number of times which the initializing procedure has been executed. The excluding unit 23 excludes a predetermined initializing procedure from initializing procedures to be determined by the determination unit 17.

Functions of the compile processing apparatus 10 are implemented in a program. The program is stored in a storage medium, such as a floppy disk, a disk of a server or the like. The program from the storage medium is installed into a memory provided in the compile processing apparatus 10 so as to be executed. As a result, the present invention of the compile processing apparatus is realized.

A description will now be given, with reference to FIG. 2, of the principle of a program executing apparatus according to an embodiment of the present invention.

Figure 2:
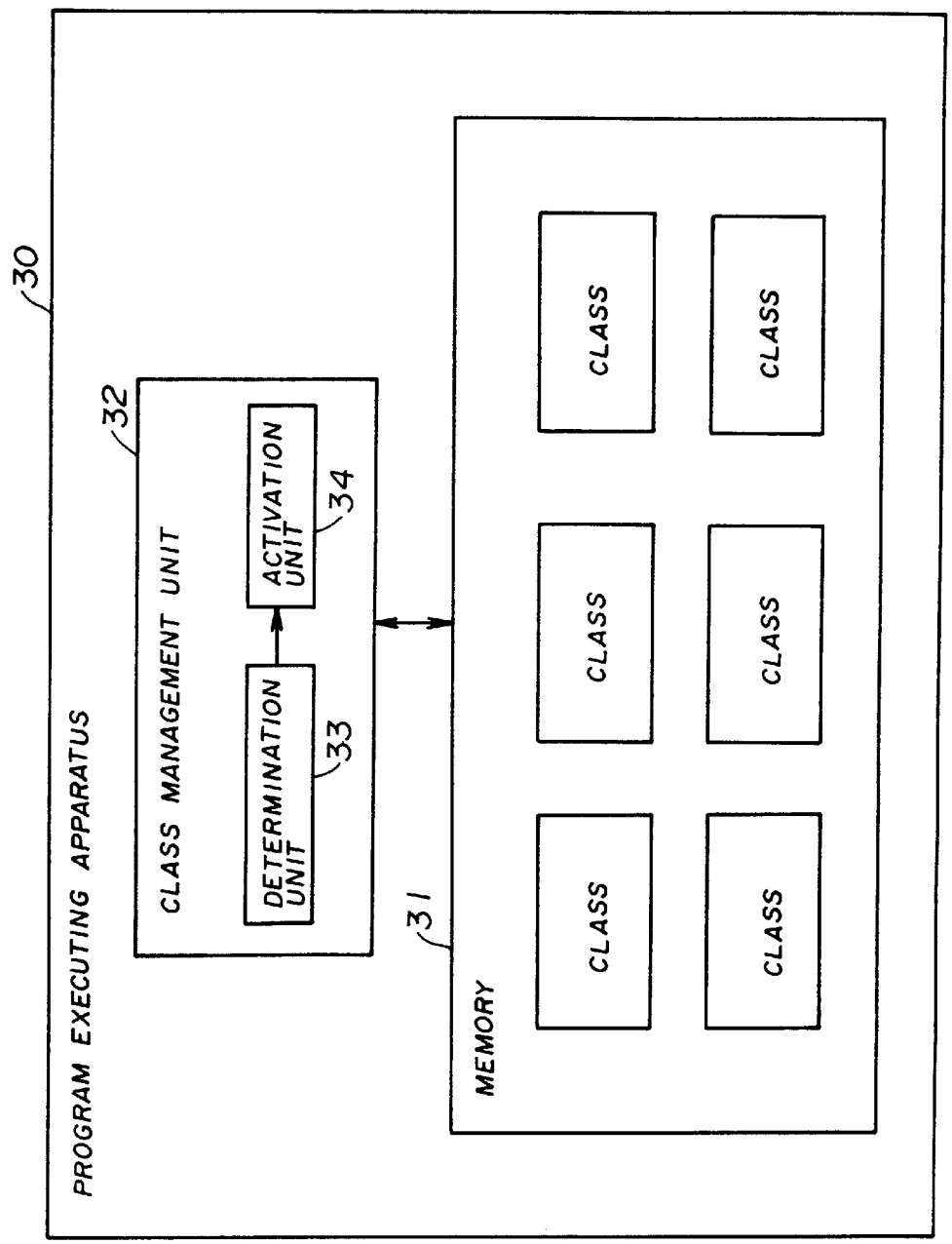
FIG. 2 is a block diagram illustrating a principle of a program executing apparatus according to an embodiment of the present invention.

Referring to FIG. 2, a program executing apparatus 30 executes a program complied by the compile processing apparatus 10 as described above. The program executing apparatus 30 has a memory unit 31 and a class management unit 32. The program (formed of a plurality of classes) complied by the compile processing unit 10 is expanded on the memory unit 31. The class management unit 32 manages classes of the program expanded on the memory unit 31.

The class management unit 32 has a determination unit 33 and an activation unit 34.

The determination unit 33 determines whether there is the information recorded by the compile processing apparatus 10 (the changing unit 18 and/or the recording unit 19) in each of the classes of the program expanded on the memory unit 31. The activation unit 34 activates the initializing procedure of each class before the program is executed.

Functions of the program executing apparatus 30 are implemented in a program. The program is stored in a storage medium, such as a floppy disk, a disk of a server or the like. The program from the storage medium is installed into a memory provided in the program executing apparatus 30 so as to be executed. As a result, the present invention of the program executing apparatus is realized.

In the compile processing apparatus 10 having the structure as described above, when a statement to be compiled is extracted by the extracting unit 15, the specifying unit 16 checks whether the extracted statement requires an initializing procedure provided in a class. If the statement requires the initializing procedure, the specifying unit 16 specifies the initializing procedure.

In response to the specifying result, the determination unit 17 checks whether the specified initializing procedure includes the attribute information managed by the management unit 20. Base on the checking result, it is determined whether the initializing procedure can be considered to not affect other classes. The initializing procedure which can be considered to not affect other classes is handled as an initializing procedure having no side effect.

In response to the determination result of the determination unit 17, the changing unit 18 changes the format of a statement requiring the initializing procedure having no side effect so that the statement does not access the initializing procedure. This matter is recorded in a class having the initializing procedure.

When it is determined, based on information about the number of times which the initializing procedure specified by the specifying unit 16 was repeatedly executed, that there is a little possibility of execution of the initializing, the initializing procedure is excluded from initializing procedures to be handled by the determination unit 17.

In the program executing apparatus 30 having the structure as described above, when an instruction for executing the program expanded on the memory unit 31 is supplied, the determination unit 33 determines whether there is the information recorded by the compile processing apparatus 10 in each of classes expanded on the memory unit 31. If the information is recorded in a class, it is determined that there is an instruction to execute the initializing procedure.

In response to the determination result of the determination unit 33, the activation unit 34 activates initializing procedures in classes in which the information is recorded before the program is executed.

In the above system, initializing procedures having no side effect out of initializing procedures in the classes are activated before the program is executed. The statement requiring the initializing procedure having no side effect is changed so as to not access the initializing procedure. As a result, in a case where the IF-sentence is not used, it is ensured that an initializing procedure included in each of classes is activated once. Thus, the execution speed of the program can be improved.

A description will now be given of an embodiment of the compile processing apparatus 10.

Figure 3:
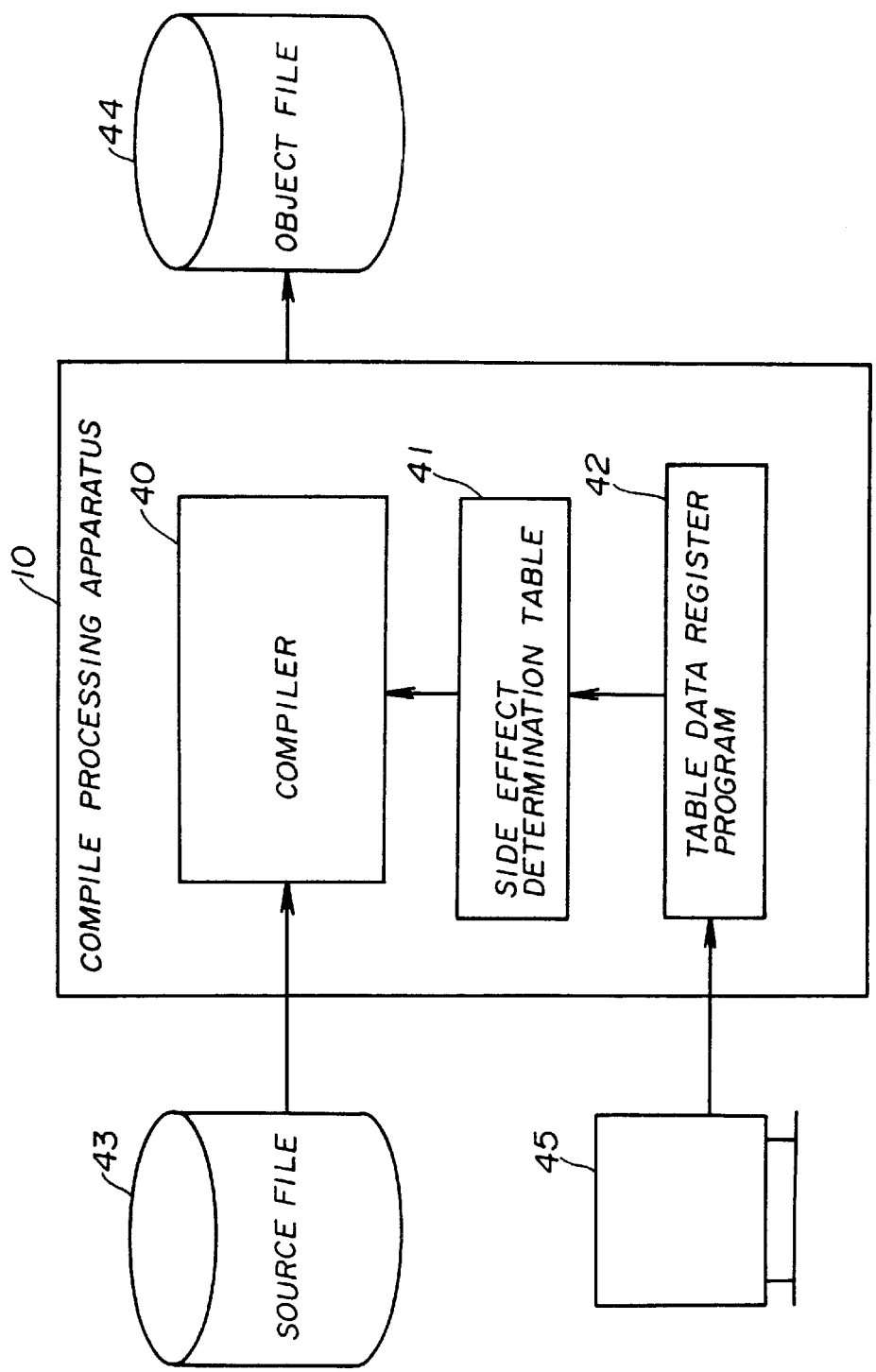
FIG. 3 is a block diagram illustrating a compile processing apparatus according to an embodiment.

FIG. 3 shows the compile processing apparatus according to an embodiment of the present invention.

Referring to FIG. 3, the compile processing apparatus 10 has a compiler 40, a side effect determination table 41 and a table data register program 42.

Figure 4:
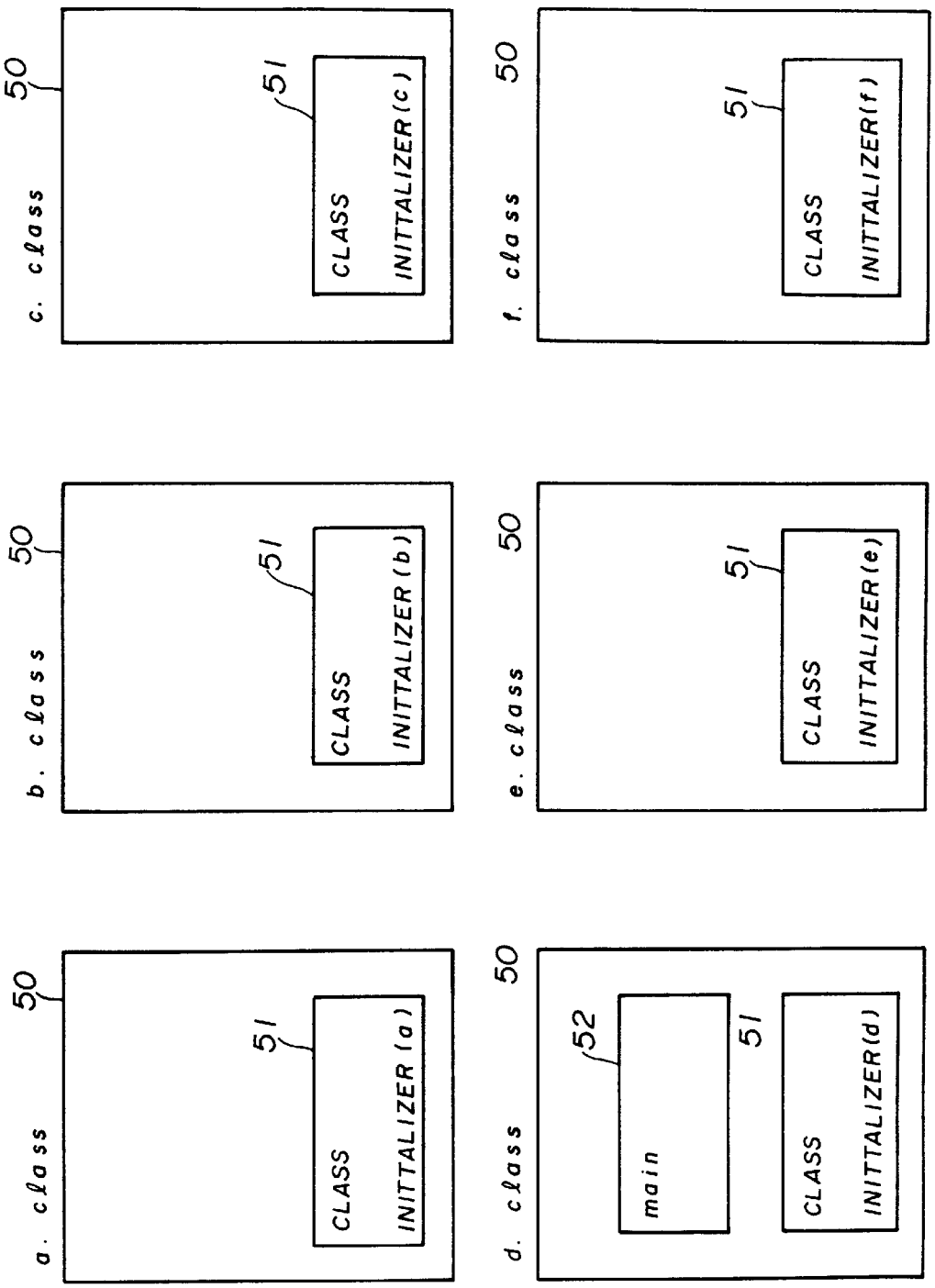
FIG. 4 is a diagram illustrating a program to be compiled.

A program to be compiled by the compiler 40 has, as shown in FIG. 4, a plurality of classes 50. Each of the classes 50 is provided with data and procedure both of which are encapsulated so that the reference of the data and the access of the procedure can be carried out. Each of the classes includes an initializing procedure named as a class-initializer 51. The class-initializer 51 is activated once and executes an initializing process before the data is accessed in the beginning or before the procedure is accessed in the beginning.

In one of the classes 50, a main program 52 is expanded. The main program 52 transmits a message of a processing request to other classes 50 in accordance with necessity and receives processing results so that a predetermined process is executed.

There are two types of the class-initializer 51. The first type of the class-initializer 51 affects other classes 50. The second type of the class-initializer 51 does not affect the other classes 50. The side effect determination table 41 manages the attribute information included in the class-initializer 51 affecting the other classes (the second type).

For example, in cases where the class-initializer 51 uses a pointer pointing external locations and external variables and carries out external accessing, the class-initializer 51 affects the other classes. The side effect determination table 41 manages such attribute information.

In this embodiment, programs of Java (a program language developed by Sun Microsystems, Inc) are compiled by the compiler 40. Thus, in the side effect determination table 41, as shown in FIG. 5, a case where a class-initializer 51 accesses data included in classes 50 other than a class of the class-initializer 51 and a case where a class-initializer 51 accesses procedure included in classes 50 other than a class of the class-initializer 51 are managed using the attribute information as a case where the class-initializer 51 affects the other classes 50.

As will be described later, a class-initializer 51 including attribute information which is not registered in the side effect determination table 41 is not handled as a class-initializer 51 affecting the other classes 50. Even if the class-initializer 51 actually affects the other classes, the class-initializer 51 having no attribute information registered in the side effect determination table 41 is handled as a class-initializer not affecting the other classes.

The table data register program 42 registers the attribute information in the side effect determination table 41 in interactive communication with a programmer. If there is a very little probability that a class-initializer 51 affects the other classes, the attribute information of the class-initializer 51 can be omitted from attribute information to be registered in the side effect determination table 41. In this case, such a class-initializer 51 is handled as a class-initializer 51 not affecting the other classes 50.

In addition, as will be described above, in a case where an class-initializer 51 having a probability that the class-initializer 51 actually affects the other classes 50 is handled as a class-initializer not affecting the other classes 50, the execution speed of a program is improved although there is a probability that a program error occurs.

The table data register program 42 registers level information together with attribute information in the side effect determination table 41 so that the register level and the attribute information correspond to each other as shown in FIG. 6. The level information indicates a degree of influence of an class-initializer with respect to the other classes 50. Due to using the side effect determination table 41 as shown in FIG. 6, the occurrence of the program error and the improvement of the execution speed of the program can be balanced.

Figure 7:
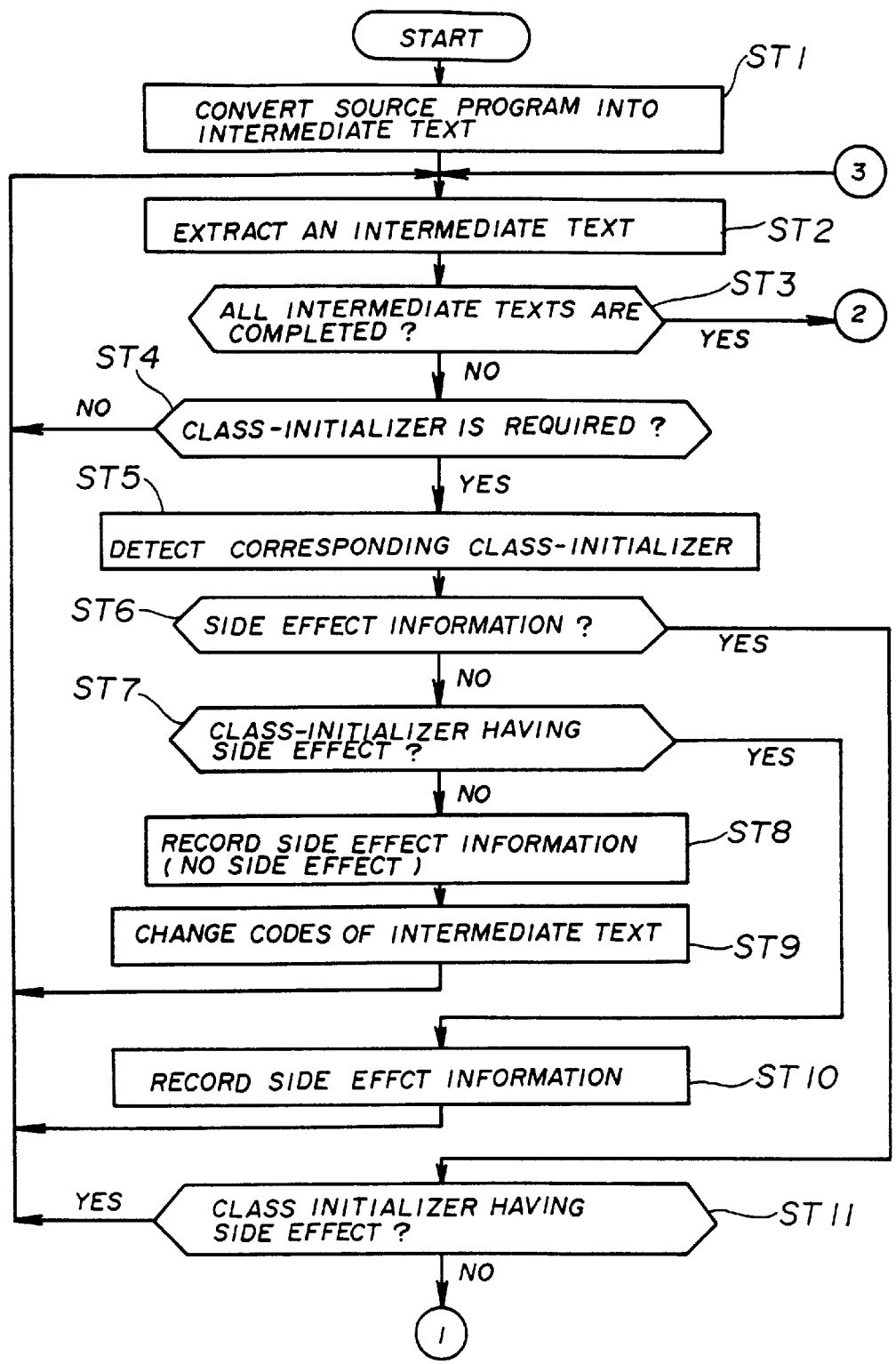
FIG. 7 is a flowchart illustrating a procedure of a process executed by the compiler.
Figure 8:
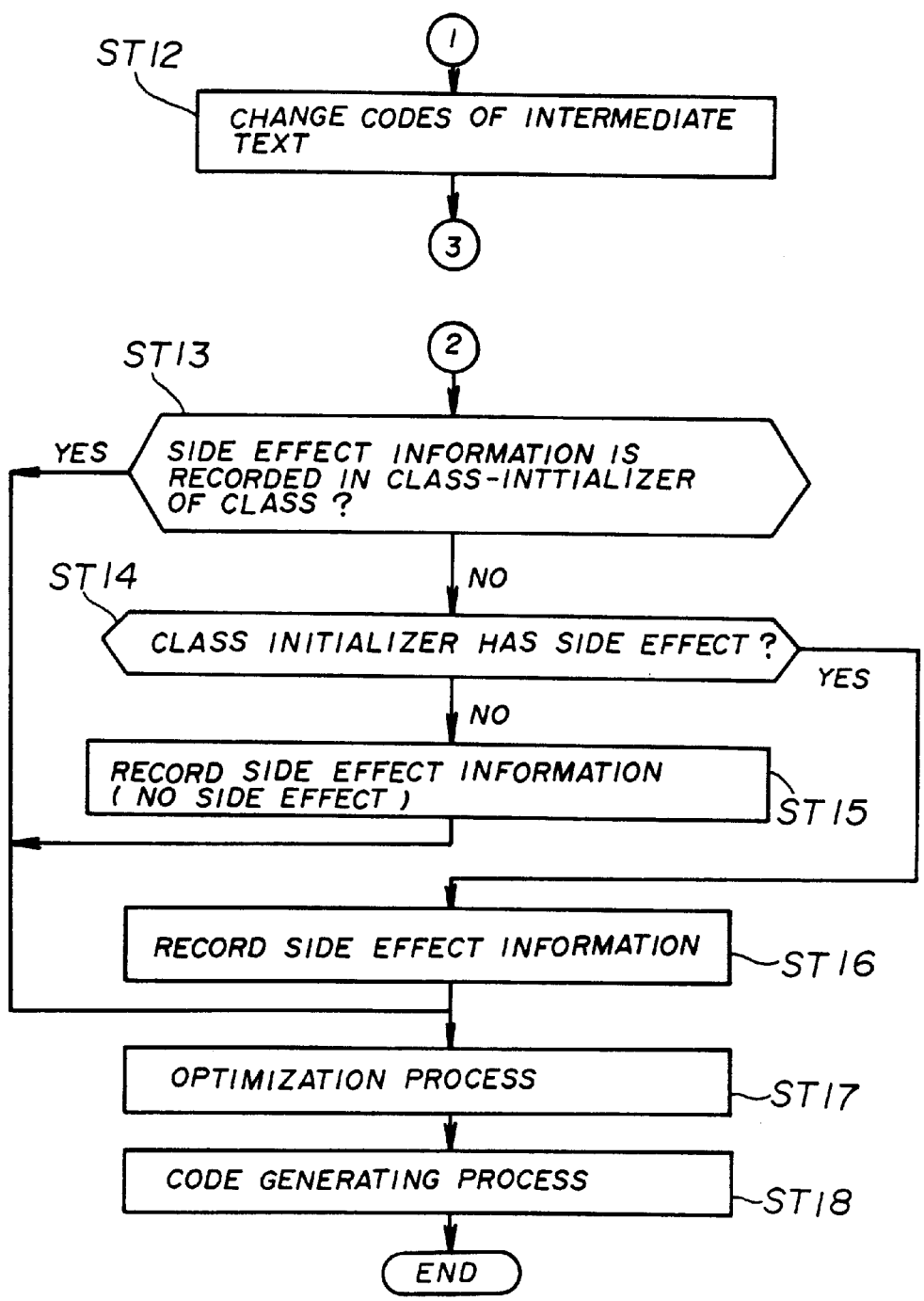
FIG. 8 is a flowchart illustrating a procedure of a process executed by the compiler.

FIGS. 7 and 8 show a procedure of a process executed by the compiler 40. A detailed description will now be given of the process executed in accordance with the procedure by the compile processing apparatus 10.

When a request for compiling a source program stored in the source file 43 is supplied, the compiler 40 successively selects classes of the source program one by one. The compiler 40 then executes the process in accordance with the procedure as shown in FIGS. 7 and 8, so that the compiling process is executed.

That is, after selecting the classes to be compiled, the compiler 40 converts the source program (bytecodes in Java), corresponding to the classes, read out from the source file 43 into intermediate texts in step 1.

A single intermediate text which has not yet been processed is extracted in step 2. It is then determined, in step 3, whether all the intermediate texts have been extracted.

When it is determined, in step 3, that all the intermediate texts have not yet been extracted, that is, that an intermediate text which has not yet been processed can be selected, it is further determined, in step 4, whether the intermediate text requires the class-initializer 51. This determination is carried out by determination of a type of the intermediate text.

For example, grammar in Java defines each of instructions "getstatic" and "putstatic" as an instruction having a probability that a class-initializer 51 is activated. In this case, if an intermediate text includes one of the instructions "getstatic" and "putstatic", it is determined that the intermediate text requires the class-initializer 51.

When it is determined, in step 4, that the intermediate text does not require the class-initializer 51, the process returns to step 2 to process the next intermediate text. On the other hand, when it is determined, instep 4, that the intermediate text requires the class-initializer 51, the process proceeds to step 5. In step 5, it is detected which class 50 includes the class-initializer 51 required by the intermediate text. Due to detection of the class, the class-initializer 51 is specified. The specifying process is carried out with reference to a symbol table provided in the compiler 40.

In an operand formed of bytecodes of Java, an index pointing an entry position in the symbol table is included. With reference to the symbol table using the index, a class 50 including the class-initializer 51 required by the intermediate text can be detected. For example, from an entry position in the symbol table pointed by "getstatic #8", it is detected that the required class-initializer 51 is included in a class "a" (a.class). That is, the class-initializer 51 included in the class "a" (a.class) is specified as the class-initializer 51 required by the intermediate text.

After step 5, it is then determined, in step 6, whether side effect information is recorded in the class. The side effect information indicates whether the specified class-initializer 51 has a side effect. Although the side effect information is recorded in step 8 or step 10 which will be described later, there is a probability that the side effect information has been recorded when another class is compiled or when another intermediate text in the same class is compiled. Thus, step 6 checks whether the side effect information has been recorded.

When it is determined, in step 6, that the side effect information is not recorded, the process proceeds to step 7. It is then determined, in step 7, whether the class-initializer 51 required by the intermediate text has a side effect. This determination is carried out with reference to the side effect determination table 41.

In the side effect determination table 41, the attribute information of the class-initializer 51 affecting other classes is managed. It is thus determined whether the class-initializer 51 has the attribute information recorded in the side effect determination table 41. When it is determined that the class-initializer 51 has the attribute information recorded in the side effect determination table 41, it is determined that the class-initializer 51 has a side effect. On the other hand, if not, it is determined that the class-initializer 51 does not have the side effect.

The level information may be managed in the side effect determination table 41 as shown in FIG. 6. The level information indicates, as described above, a degree of influence of an class-initializer with respect to the other classes 50. In this case, a programmer specifies a value of the level information. The determination process is carried out using the attribute information corresponding to the level information within a range between the maximum value and the specified value.

When it is determined, in step 7, that the class-initializer 51 required by the intermediate text does not have the side effect, the process proceeds to step 8. In step 8, the side effect information indicating that the class-initializer 51 has no side effect is recorded in the class 50 including the class-initializer 51 required by the intermediate text. In step 9, codes of the intermediate text are changed so that the intermediate text does not access the class-initializer 51 having no side effect. The process then proceeds to step 2 to process the next intermediate text.

On the other hand, when it is determined, in step 7, that the class-initializer 51 required by the intermediate text has the side effect, the process proceeds to step 10. In step 10, the side effect information indicating that the class-initializer 51 has the side effect is recorded in the class 50 including the class-initializer 51 required by the intermediate text. The process then proceeds to step 2 to process the next intermediate text.

On the other hand, when it is determined, in step 6, that the side effect information is recorded in the class 50 including the class-initializer 51 required by the intermediate text, the process proceeds to step 11. It is then determined based on the side effect information, in step 11, whether the class-initializer 51 has the side effect.

If it is determined, in step 11, that the class-initializer 51 required by the intermediate text has no side effect, the process proceeds to step 12 shown in FIG. 8. In step 12, codes of the intermediate text are changed so that the intermediate text does not access the class-initializer 51. The process returns to step 2 to process the next intermediate text. On the other hand, if it is determined, in step 11, that the class-initializer 51 required by the intermediate text has the side effect, the process directly proceeds to step 2.

During the above process, when it is determined, in step 3, that all the intermediate texts included in the class 50 to be compiled have been completely processed, the process proceeds to step 13 shown in FIG. 8. It is then checked, in step 13, whether the side effect information of the class-initializer 51 included in the class 50 is recorded in the class 50 to be compiled.

When it is determined, in step 13, that the side effect information is not recorded, the process proceeds to step 14. It is then determined, in step 14, whether the class-initializer 51 included in the class 50 to be compiled has the side effect, in the same manner as in step 7. If it is determined that the class-initializer 51 has no side effect, the process proceeds to step 15. In step 15, the side effect information indicating that the class-initializer 51 has no side effect is recorded in the class 50. On the other hand, if it is determined that the class-initializer 51 has the side effect, the process proceeds to step 16. In step 16, the side effect information indicating the class-initializer 51 has the side effect is recorded in the class 50.

When the process in step 15 or 16 is completed, or when it is determined, in step 13, that the side effect information is recorded, the process proceeds to step 17. In step 17, an optimization process for conditions of the compiling is carried out. Then, in step 18, a code generating process is carried out. As a result, object codes of the class 50 to be compiled are generated and the process is then ended.

The compiler 40 applies the process executed in accordance with the procedure as shown in FIGS. 7 and 8 to each of the classes so that the compiling process is executed.

As has been described above, the compiler 40, as to an intermediate text requiring the class-initializer 51 having no side effect, changes codes of the intermediate text so that the intermediate text does not access the class-initializer 51. The compiler 40 then records the side effect information indicating that the class-initializer 51 has no side effect in the class 50 including the class-initializer 51.

In the process shown in FIGS. 7 and 8, the compiler 40 detects whether the class-initializer 51 has the side effect.

The compiler 40 then changes the intermediate text based on the detecting result and records the detecting result in the class 50 in synchronism with the changing process. However, before or after the changing process for the intermediate text, the compiler 40 may detects whether the class-initializer 51 included in the class 50 has the side effect and record the detecting result in the class 50, separately from the changing process.

A description will now be given of the program executing apparatus 30 which executes a program compiled by the compile processing apparatus 10 as described above.

Figure 9:
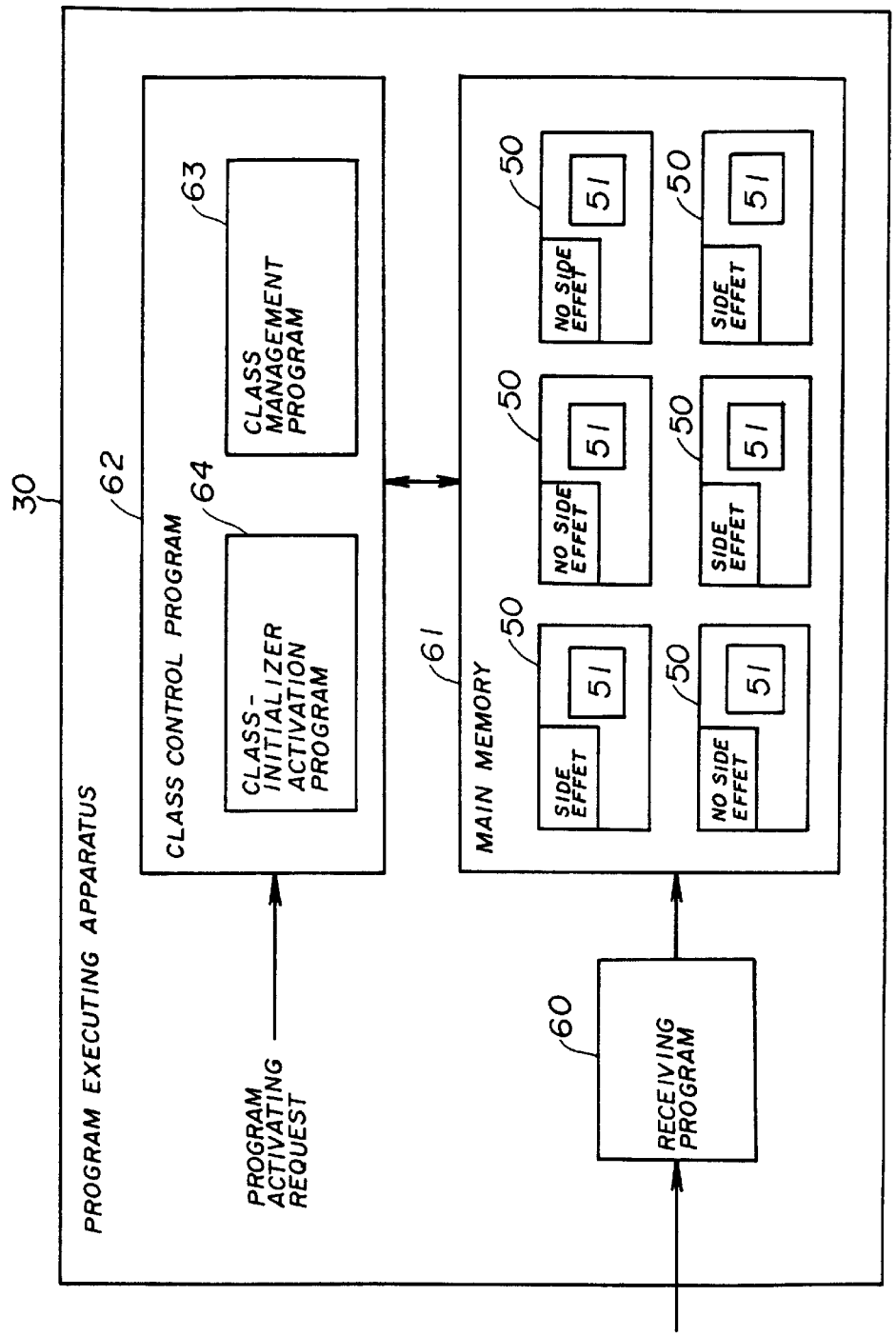
FIG. 9 is a block diagram illustrating a program executing apparatus according to an embodiment of the present invention.

The program executing apparatus 30 according to an embodiment of the present invention is formed as shown in FIG. 9.

Referring to FIG. 9, the program executing apparatus has an receiving program 60, a main memory 61 and a class management program 62. The receiving program 60 receives a program compiled by the compile processing apparatus 10. The program received by the receiving program 60 is stored in the main memory 61. The class management program 62 manages the program, having a plurality of classes 50, stored in the main memory 61.

The class management program 62 has a class control program 63 and a class-initializer activation program 64. The class control program 63 controls the program starting from "Main" so as to execute data processing. The class-initializer activation program 64 carries out an activation process for the class-initializer 51 included in each of the classes 50.

Figure 10:
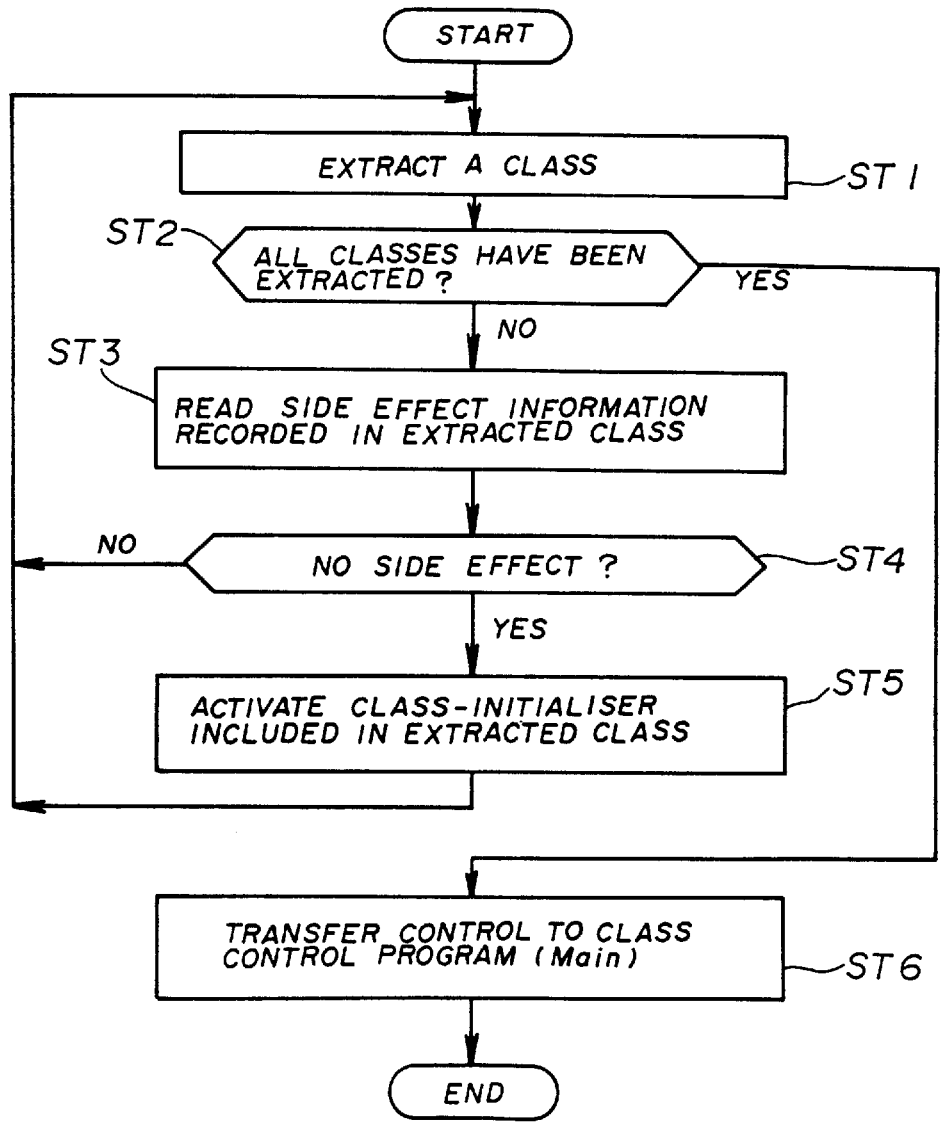
FIG. 10 is a flowchart illustrating a procedure of a process for executing a class-initializer activation program.

FIG. 10 shows a procedure of the process executed by the class-initializer activation program 64. A description will now be given of the process executed by the program executing apparatus 30 in accordance with the procedure shown in FIG. 10.

Referring to FIG. 10, when a program activating request is issued to the class control program 63, the class-initializer activation program 54 extracts, in step 1, a class which has not yet been processed from the classes 50 stored in the main memory 61. It is then determined, in step 2, whether all the classes 50 have been extracted.

If it is determined, in step 2, that all the classes 50 have not yet been extracted, that is, if a class which has not yet been processed can be selected, the process proceeds to step 3. In step 3, the side effect information is read out from the extracted class 50. Sine the program was compiled by the compile processing apparatus 10 as has been described above, the side effect information is recorded in each class 50. Thus, such side effect information is read out.

It is then determined, in step 4, whether the side effect information extracted in step 3 indicates that the class-initializer 51 has no side effect. If it is determined the side effect information indicates that the class-initializer 51 has the side effect, the process returns to step 1 to process the next class. On the other hand, if it is determined that the side effect information indicates that the class-initializer 51 has no side effect, the class-initializer 51 included in the class 50 is activated and the process then returns to step 1.

If it is determined, in step 2, that all the classes 50 have been completely extracted, the process proceeds to step 6. In step 6, control is transferred to the class control program 63 so as to be transferred to the "Main" and the process is ended.

As has been described above, the class-initializer activation program 64 activates the class-initializer 51 which is detected as a class-initializer 51 having no side effect by the compile processing apparatus 10 before the program is executed.

According to the present embodiment, the class-initializer 51 having no side effect is activated before the program is executed and a part of the program requiring the class-initializer 51 having no side effect is changed so that the class-initializer 51 is not accessed. Thus, it can be ensured, without using the IF-sentence, that the class-initializer 51 is activated only once.

A detailed description will now be given of the present embodiment using a program of the Java.

It is assumed that a program is formed of a class "a" and a class "b" as shown in FIG. 11.

The class "aw is a part of a "Main" program and carries out a process for inclement a value of a variable i defined by the class "b" by one and returns the value to class "b". In addition, the class "a" has a class-initializer 51 (CI) for indicating a character string "START".

The class "b" defines the variable i as a variable which can be referred by other classes and carries out a printing operation for the variable i. In addition the class "b" has a class-initializer 51 (CI) for reset the variable i to zero.

"static ( )" indicates the class-initializer 51.

When the program is received, the compiler 40 generates an intermediate text of the class "a" as shown in FIG. 12 and an intermediate text of the class "b" as shown in FIG. 13.

In the intermediate text of the class "a" shown in FIG. 12, a symbol table is accessed using "getstatic #8", so that it is recognized that a value of the variable i is to be received. In addition, the symbol table is accessed using "putstatic #8", so that it is recognized that a value is to be written in the variable i. Further, the symbol table is accessed using "invokestatic #10", so that the detailed contents of a procedure "print ( )" can be obtained. The symbol table is accessed using "getstatic #9", so that a destination to which a value is to be output is recognized. The symbol table is then accessed using "ldc "1", so that a character string to be output is recognized. Further, the symbol table is accessed using "invokevirtual #11", so that the detailed contents of a procedure "println ( )" can be obtained.

In addition, the intermediate text of the class "b" shown in FIG. 13, the symbol table is accessed using "getstatic #7", so that a destination to which a value is to be output is recognized. The symbol table is then accessed using "getstatic #6", so that it is recognized that a value of the variable i is to be received. The symbol table is accessed using "invokevirtual #8", so that the detailed contents of a procedure "println ( )" can be obtained. In addition, the symbol table is accessed using "putstatic #6", so that it is recognized that zero is to be written in the variable i.

The compiler 40 determines whether the class-initializer 51 included in each of the classes has the side effect.

The class-initializer 51 included in the class "a" has an intermediate text "invokevirtual #11". Sine the "invokevirtual" may access other classes, it is determined that the class-initializer 51 has the side effect. On the other hand, the class-initializer 51 included in the class "b" has an intermediate text "incost_0"/"return" which has no side effect and an intermediate text "putstatic" which has not effect if the class "a" is accessed. Thus, it is determined that the class-initializer 51 included in the class "b" has no side effect.

When the compiler 40 detects an intermediate text requiring the class-initializer 51 having no side effect in the compiling process for the intermediate text, the compiler 40 changes codes of the intermediate text so that the intermediate text does not access the class-initializer 51.

In the above example, the class "a" requires the variable i of the class "b", and the class-initializer 51 included in the class "b" for the process of resetting the value of the variable i to zero has no side effect. Thus, the codes of the intermediate text included in the class "a" requiring variable i are changed so that the intermediate text does not access the class-initializer 51 of the class "b". The intermediate text of the class "a" shown in FIG. 12 is thus changed to that shown by arrows in FIG. 14 using "quick" for an instruction of not accessing the class-initializer 51.

Due to the process as has been described above, the source program of the classes "a" and "b" shown in FIG. 11 is compiled to object codes shown in FIG. 15. Referring to FIG. 15, "a.Init_flg=OFF" indicates that the class-initializer 51 of the class "a" has the side effect. "b.Int_flg=ON" indicates that the class-initializer 51 of the class "b" has no side effect.

In FIG. 15, a portion α of the program is a program which is made to be executed by the class-initializer activation program 64. The class-initializer activation program 64 executes the activation process in accordance with the portion α of the program. In the activation process, when the "a.Init_flg" is set at NO indicating that there is no side effect, the class-initializer 51 included in the class "a" is activated before the program is executed. When the "b.Init_flg" is set at NO indicating that there is no side effect, the class-initializer 51 included in the class "b" is activated before the program is executed.

According to the above embodiment, it is ensured that the class-initializer 51 included in each of the classes can be activated only once without using the IF-sentence.

On the other hand, in the prior art, as shown in FIG. 16, it is checked, using the IF-sentence, whether the class-initializer 51 has been activated. When it is determined that the class-initializer 51 has been activated, the class-initializer 51 is not accessed. When it is determined that the class-initializer 51 has not yet been activated, the class-initializer 51 is accessed and a flag indicating that the class-initializer 51 has been activated is turned on. Thus, since the checking process for the class-initializer 51 is carried out using the IF-sentence every time, the execution speed of the program is lowered.

In the above embodiment, all the class-initializers 51 are processed. However, class-initializers having low probabilities of execution may be omitted to be processed. Due to the omission of the class-initializers 51, the compile processing time can be reduced.

For example, class-initializers 51 having a low probabilities of execution are specified with reference to a profile result. The specified class-initializers 51 are omitted to be processed, so that the compile processing time is reduced. The number of times which a class-initializer 51 having a low probability is executed is small. Thus, Using the IF-sentence for the class-initializers 51 having low probabilities of execution little affect the execution time. This is substantially no problem.

In the above embodiment, the classes of the object oriented program are used. However, the concept of the class includes a generally capsulated matter.

The present invention is not limited to the aforementioned embodiments, and other variations and modifications may be made without departing from the scope of the claimed invention.

The present application is based on Japanese priority application No.9-298105 filed on Oct. 30, 1997, the entire contents of which are hereby incorporated by reference.

What is claimed is:

1. A compile processing apparatus compiling a program formed of a plurality of classes having an initializing procedure, comprising:

a specifying device that specifies an initializing procedure when a statement to be compiled requires the initializing procedure;

a determination device that determines whether the initializing procedure specified by the specifying device can be considered to not affect other classes; and a changing device that changes the statement so that the statement does not access the initializing procedure when the determination device determines that the initializing procedure can be considered to not affect the other classes.

2. The compile processing apparatus as claimed in claim 1, wherein the changing device records information indicating that the initializing procedure does not affect the other classes in a class.

3. The compile processing apparatus as claimed in claim 1, further comprising:

a recording device that detects initializing procedures which can be considered to not affect the other classes and records information indicating that an initializing procedure can be considered to not affect the other classes in a class including the detected initializing procedures.

4. The compile processing apparatus as claimed in claim 1, further comprising:

a management device that manages an attribute information item with initializing procedures affecting the other classes, wherein the determination device determines whether an initializing procedure has an attribute information item managed by the management device so that the determination device is executed.

5. The compile processing apparatus as claimed in claim 4, wherein the management device further manages a level information item corresponding to the attribute information item, and the level information item indicates a degree of influence with respect to the other classes, and wherein the determination device determines using the attribute information items corresponding to a level information item specified.

6. The compile processing apparatus as claimed in claim 4, further comprising:

a registering device that registers data in the management device in an interactive process.

7. The compile processing apparatus as claimed in claim 1, further comprising:

an obtaining device that obtains a number of times which the initializing procedure is executed; and an omitting device that omits the initializing procedure specified by the specifying device from the initializing procedures to be determined by the determination device when it is determined, based on the number of times, that there is a little probability that the specified initializing procedure affects the other classes.

8. A compile processing method compiling a program formed of a plurality of classes having initializing procedures, comprising:

specifying an initializing procedure when a statement to be compiled requires the initial procedure;

determining whether the initializing procedure specified in the specifying can be considered to not affect other classes; and changing the statement so that the statement does not access the initializing procedure when the determining determines that the initializing procedure can be considered to not affect the other classes.

9. A computer readable storage medium storing a first program used to implement a compile processing apparatus compiling a second program formed of a plurality of classes having initializing procedures, said first program comprising:

specifying an initializing procedure when a statement to be compiled requires the initializing procedure;

determining whether the initializing procedure specified by the specifying can be considered to not affect other classes; and changing the statement so that the statement does not access the initializing procedure when the determining determines that the initializing procedure can be considered to not affect the other classes.

10. A program executing apparatus that executes a program formed of a plurality of classes having initializing procedures, comprising:

a determining device that determines whether information indicating that an initializing procedure is to be executed is recorded in each of the plurality of classes when the program is executed; and an activating device that activates the initializing procedure included in a class, before the program is executed, when the determining device determines that the information is recorded in the class.

11. A program executing method executing a program formed of a plurality of classes having initializing procedures, comprising:

determining whether information indicating that an initializing procedure is to be executed is recorded in each of the plurality of classes when the program is executed; and activating the initializing procedure included in a class, before the program is executed, when the determining determines that the information is recorded in the class.

12. A computer readable storage medium storing a first program used to implement a compile processing apparatus compiling a second program formed of a plurality of classes having initializing procedures, said first program comprising:

determining whether information indicating that an initializing procedure is to be executed is recorded in each of classes when the program is executed; and activating the initializing procedure included in a class, before the program is executed, when the determining determines that the information is recorded in the class.

13. The method of claim 8, wherein the changing further records information indicating that the initializing procedure does not affect the other classes in a class.

14. The method of claim 8, further comprising:

detecting initializing procedures which can be considered to not affect the other classes; and recording information indicating that an initializing procedure can be considered to not affect the other classes in an additional class including the detected initializing procedures.

15. The method of claim 8 further comprising:

managing an attribute information item with initializing procedures affecting the other classes, wherein the determining further determines whether an initializing procedure has an attribute information item managed by the managing so that the determining executes the determining when the initializing procedure specified can be considered to not affect other classes.

16. The method of claim 15, wherein the managing further manages a level information item corresponding to the attribute information item, wherein the level information item indicates a degree of influence with respect to the other classes, and the determining uses the attribute information items corresponding to level information items specified.

17. The method of claim 15 further comprising:

registering data from in an interactive process.

18. The method of claim 8, further comprising:

recording a number of times which the initializing procedure is executed, wherein the determining determines, based on the number of times of execution, that there is a little probability that the specified initializing procedure affects the other classes.

* * * * *